Aug. 6, 1929.  G. M. CROIL  1,723,768

MOTION PICTURE FILM FEEDING DEVICE

Filed June 25, 1928

INVENTOR:-
G. M. Croil
BY
E. J. Fetherstonhaugh
ATTORNEY

Patented Aug. 6, 1929.

1,723,768

UNITED STATES PATENT OFFICE.

GEORGE MITCHELL CROIL, OF CAMP BORDEN, ONTARIO, CANADA.

MOTION-PICTURE-FILM-FEEDING DEVICE.

Application filed June 25, 1928. Serial No. 288,204.

This invention relates to a device for storing and feeding an endless film or the like, as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to store an endless film, belt, rope, cable or the like, for delivery or feeding to an apparatus or machine, and especially to store an endless film for feeding into a motion picture machine; to build a device whereby a continuously-repeating motion picture projection is possible for advertising or other purposes; and generally, to provide a useful device capable of accomplishing the aforesaid purposes, with a minimum of friction or wear upon the film, belt, etc.

In the drawings.

Like numerals of reference indicate corresponding parts in the various figures.

Figure 2:
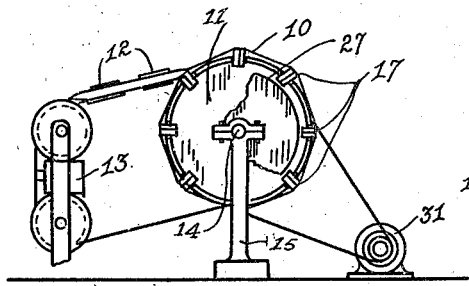
Figure 2 is a fragmentary side view of Figure 1.
Figure 1:
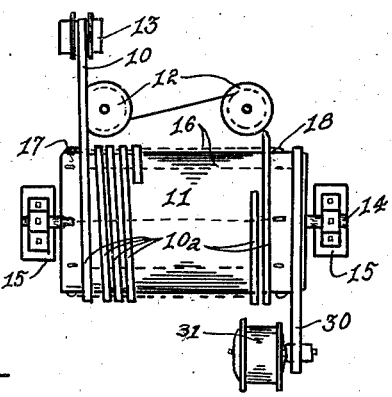
Figure 1 is a plan view of a motion picture film feeding device, (the motion picture apparatus proper being diagrammatically suggested only,) showing an application of the present invention.
Figure 3:
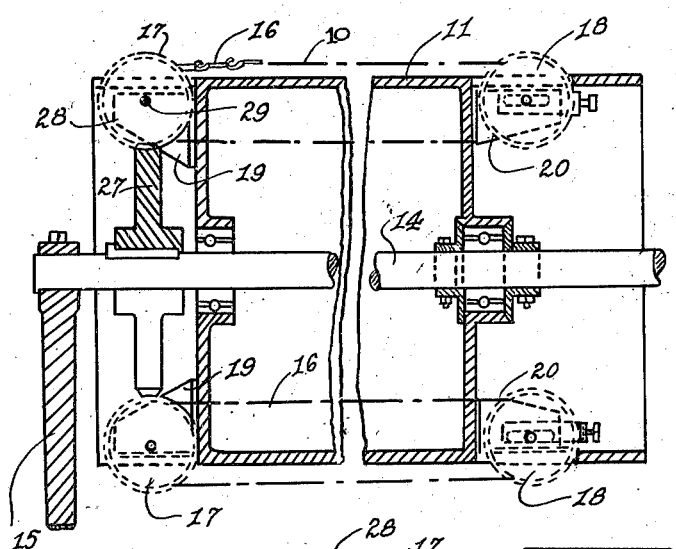
Figure 3 is a cross-section of the feeding or storage drum, parts of the supporting standards being broken away.

Referring to the drawings, the film or belt 10 is wound spirally around the drum 11 or more particularly over the endless chains 16, with the consecutive loops, coils or rings 10$^A$ lying as closely to one another as possible; the film is trained over pulleys or wheels 12 and passed through the motion picture machine or apparatus 13, and the ends made to overlap and cemented to form in effect an endless film. Thus with such an endless film, a continuously-repeating motion picture projection or performance is possible.

The drum 11 is journalled on the horizontally-arranged shaft 14 fixed in standards 15, and carries the endless sprocket chains or conveyers 16 at uniformly spaced intervals; the chains are trained over the sprockets 17 and 18 journalled in the brackets 19 and 20, respectively, secured to the drum.

The chains should be sufficient in number or so positioned, that the film will clear the surface of the drum; thus the various loops 10$^A$ of the film 10 are carried or borne by chains and can be shifted over the surface of the drum without engaging same, and therefore without wear.

Figure 5:
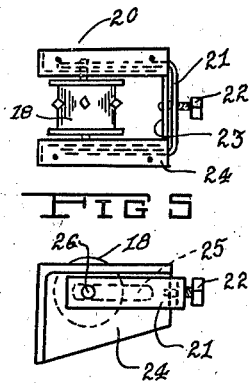
Figure 5 is a plan view of one of the chain tension-adjusting brackets.
Figure 6:
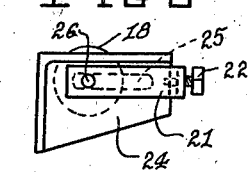
Figure 6 is a side view of Figure 5.
Figure 4:
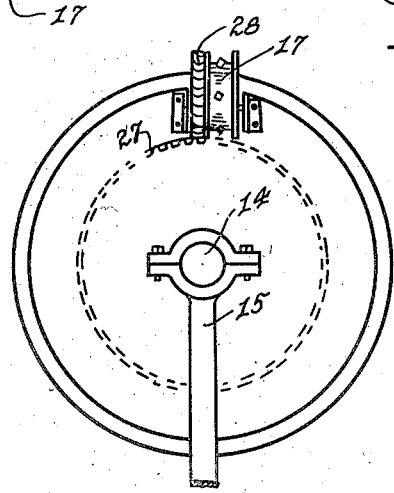
Figure 4 is an end view of Figure 3.

Each of the brackets 20 is made in two parts adjustable relatively one to the other, for chain-tensioning purposes, and may be made substantially as shown in Figures 5 and 6 wherein the shaft 26 of the sprocket 18 is journalled in the U-shaped strap 21 which threadingly carries a screw 22 bearing on the end wall 23 of the bracket proper 24, the bracket being slotted as at 25 to form a clearance for the shaft 26.

On the shaft 14 is fixed a worm 27 meshing with a worm gear 28 fixed to the shaft 29 of each of the sprockets 17. As the drum rotates on the fixed shaft, the meshing engagement of the worm gears 28 with the fixed worm 27 causes the sprockets 17 to be rotated, therefore causing the endless chains to move horizontally to gradually shift the coils of the film horizontally from one end of the drum to the other.

The drum may be rotated in any suitable way, as with a belt 30 trained over the drum and actuated from the motor 31. The rotation of the drum may be utilized to feed the film through the motion picture machine, or the film fed through the machine by means other than separate from that rotating the drum.

The velocity of the endless chains must be such that for every revolution of the drum, each coil or loop will be shifted horizontally a distance equivalent to the distance between any two consecutive coils.

It will be seen that the film as a whole, while wound over the chains and not engaging the drum, can be stored, and shifted without friction.

It is possible that this invention may be found to have practical applications and adaptations other than to motion picture machines.

What I claim as my invention is:

1. In a device for storing an endless film, a rotary member, spaced endless carriers mounted on said member in parallel arrangement with the axis thereof and adapted to retain the belt away from the outside periphery of said member, and means for simultaneously actuating said member and carriers.

2. In a device for storing an endless film, a drum rotatably mounted in a horizontal axis, spaced endless carriers mounted on said drum in parallel arrangement with the axis thereof and adapted to retain the belt out of engagement with the outside periphery of said drum, and means for simultaneously actuating said drum and carriers.

3. A device for storing an endless film and feeding same to a motion picture machine, comprising a rotary member, a plurality of endless conveyers mounted on said member and adapted to be engaged by the spirally coiled film and retain same clear of the outside periphery of said member, means for actuating said member, and means for actuating said conveyers simultaneously from the rotation of said member.

4. In a motion picture machine, a drum rotatably mounted in a horizontal axis adjacent the motion picture projection apparatus, spaced endless conveyers mounted on said drum in parallel arrangement with the axis thereof and engaged by an endless film, means for guiding the film from the drum as it leaves same to said apparatus for operative projection, and means for simultaneously actuating said drum and conveyers.

5. In a device for storing an endless film and feeding same to a motion picture apparatus, a rotatable member, endless carriers mounted on said member in parallel arrangement with the axis thereof and adapted to receive the coiled film and retain same out of engagement with the outside periphery of said member, means for guiding the film from said member as it leaves same to the motion picture apparatus for operative projection, means for actuating said member, means for adjusting the tension in said endless carriers, and means for actuating said carriers simultaneously from the rotation of said member.

6. In a device for storing an endless belt or the like, a non-rotatable shaft, means for mounting said shaft, a drum rotatably mounted on said shaft, means for actuating said drum, sprockets in pairs mounted on said drum to project outside the periphery thereof, a sprocket chain trained between each pair of sprockets, means for tensioning said chains, a worm gear rigid with one sprocket in each of said pairs of sprockets, and a worm rigid on said shaft and meshing with each of said worm gears.

Signed at Camp Borden this 11th day of April, 1928.

G. M. CROIL.